United States Patent [19]

Kolstad et al.

[11] Patent Number: 5,124,025
[45] Date of Patent: Jun. 23, 1992

[54] PROCESS FOR DEASPHALTING RESID, RECOVERING OILS, REMOVING FINES FROM DECANTED OIL AND APPARATUS THEREFOR

[75] Inventors: Jeffrey J. Kolstad, Glen Ellyn; William I. Beaton, Wheaton; James L. Taylor, Naperville, all of Ill.

[73] Assignee: Amoco Corporation, Chicago, Ill.

[21] Appl. No.: 616,219

[22] Filed: Nov. 20, 1990

Related U.S. Application Data

[63] Continuation-in-part of Ser. No. 381,372, Jul. 18, 1989, Pat. No. 5,013,427.

[51] Int. Cl.⁵ .............................................. C10G 21/00
[52] U.S. Cl. ....................... 208/309; 208/86; 208/87; 208/162; 208/212; 208/251 H; 208/254 H

[58] Field of Search ............... 208/309, 311, 314, 315, 208/322, 162, 86, 96, 312, 212

[56] References Cited

U.S. PATENT DOCUMENTS

| | | | |
|---|---|---|---|
| 2,692,222 | 10/1954 | Pakie | 208/311 |
| 2,900,308 | 8/1959 | Malyear, Jr. | 208/311 |
| 3,798,157 | 3/1974 | Manzanettu et al. | 208/309 |
| 4,354,922 | 10/1982 | Derbyshire et al. | 208/309 |

Primary Examiner—Helane Myers
Attorney, Agent, or Firm—Thomas W. Tolpin; William H. Magidson; Ralph C. Medhurst

[57] ABSTRACT

The invention reduces cracking catalyst fines in decanted oil by mixing the decanted oil (DCO) containing cracking catalyst fines with asphaltene and then treating the DCO-asphaltene mixture with a non-aromatic hydrocarbon solvent in an extraction unit or in a multistage deasphalting unit.

21 Claims, 3 Drawing Sheets

PROCESS FOR DEASPHALTING RESID, RECOVERING OILS, REMOVING FINES FROM DECANTED OIL AND APPARATUS THEREFOR

CROSS-REFERENCE TO RELATED APPLICATION

The present invention is a continuation-in-part of copending application Ser. No. 07/381,372 filed Jul. 18, 1989, now U.S. Pat. No. 5,013,427.

BACKGROUND OF THE INVENTION

The present invention relates to a improved process for deasphalting resid and substantially removing cracking catalyst fines from decanted oil.

Catalytic cracking of oil is an important refinery process which is used to produce gasoline and other hydrocarbons. During catalytic cracking, the feedstock, which is generally a cut or fraction of crude oil, is cracked in a reactor under catalytic cracking temperatures and pressures in the presence of a catalyst to produce more valuable, lower molecular weight hydrocarbons. Gas oil is usually used as a feedstock in catalytic cracking. Gas oil feedstocks typically have a boiling range from 650° F. to 1000° F. and less than 1% RAMS carbon by weight. Gas oil feedstocks also typically contain less than 5% by volume naphtha and lighter hydrocarbons having a boiling temperature below 430° F., from 10% to 30% by volume diesel and kerosene having a boiling range from 430° F. to 650° F., and less than 10% by volume resid having a boiling temperature above 1000° F. It is desirable to provide an effective process to increase the yield of gasoline (naphtha) in catalytic cracking units.

It has been known to deasphalt and catalytically crack virgin unhydrotreated, low sulfur resid as well as to deasphalt, subsequently hydrotreat, and catalytically crack high sulfur resid. However, better demetalization and higher resid conversion are desirable.

Furthermore, such prior art processes produce hydrogen-rich asphaltenes which are difficult and expensive to handle and process, melt (liquify) at relatively low temperatures, and which cannot be used as solid fuel. Asphaltenes are difficult to blend into fuel oils, and are not generally usable and desirable for asphalt paving or for use in other products.

In the past, spiraling oil costs and extensive price fluctuations have created instability and uncertainty for net oil consuming countries, such as the U.S. It has been difficult to attain adequate supplies of high-quality, low-sulfur, petroleum crude oil (sweet crude) from Nigeria, Norway, and other countries at reasonable prices for conversion into gasoline, fuel oil, and petrochemical feedstocks. In an effort to stabilize the supply and availability of crude oil at reasonable prices, Amoco Oil Company has developed, constructed, and commercialized extensive, multimillion dollar refinery projects under the Second Crude Replacement Program (CRP II) to process poorer quality, high-sulfur, petroleum crude oil (sour crude) and demetalate, desulfurize, and hydrocrack resid to produce high-value products, such as gasoline, distillates, catalytic cracker feed, metallurgical coke, and petrochemical feedstocks. The Crude Replacement Program is of great benefit to the oil-consuming nations since it provides for the availability of adequate supplies of gasoline and other petroleum products at reasonable prices while protecting the downstream operations of refining companies.

During resid hydrotreating, such as under Amoco Oil Company's Crude Replacement Program, resid oil is upgraded with hydrogen and a hydrotreating catalyst to produce more valuable lower-boiling liquid products. However, undesirable carbonaceous solids are formed during resid hydrotreating. These solids have been characterized as multicondensed aromatics which form and precipitate from cracking of the side chains of asphaltenes. These carbonaceous solids are substantially insoluble in hexane, pentane, and in the effluent hydrotreated product oil. The solids become entrained and are carried away with the product. Such solids tend to stick together, adhere to the sides of vessels, grow bigger, and agglomerate. Such solids are more polar and less soluble in other hydrocarbons than the residual oil feedstock. Carbonaceous solids are produced as a reaction by-product during ebullated bed hydrotreating (expanded bed hydrotreating). During ebullated bed hydrotreating, the ebullating hydrotreating catalyst fines can serve as a nucleus and center for asphaltene growth. The situation becomes even more aggravated when two or more hydrotreating reactors are connected in series as in many commercial operations. In such cases, solids formed in the first reactor not only form nucleation sites for solids growth and agglomeration in the first reactor, but are carried over with the hydrotreated product oil into the second reactor, etc., for even larger solids growth and agglomeration.

The concentration of carbonaceous solids increases at more severe hydrotreating conditions, at higher temperatures and at higher resid conversion levels. The amount of carbonaceous solids is dependent on the type of feed. Operability at high resid conversion is limited by the formation of carbonaceous solids.

Solids formed during resid hydrotreating cause deposition and poor flow patterns in the reactors, as well as fouling, plugging, and blocking of conduits and downstream equipment. Oils laden with solids cannot be efficiently or readily pipelined. Hydrotreating solids can foul valves and other equipment, and can build up insulative layers on heat exchange surfaces reducing their efficiency. Buildup of hydrotreated solids can lead to equipment repair, shutdown, extended downtime, reduced process yield, decreased efficiency, and undesired coke formation.

Decanted oil (DCO) is a valuable solvent and is used advantageously in the resid hydrotreating unit for controlling the carbonaceous solids therein. However, decanted oil is normally obtained from a catalytic cracking unit and contains cracking catalyst solids or fines therein. These fines are small particles made up of the catalyst used in the catalytic cracking unit.

For a fluid catalytic cracking unit, the preferred cracking catalysts are those containing crystalline aluminosilicates, zeolites, or molecular sieves in an amount sufficient to materially increase the cracking activity of the catalyst, e.g., between about 1 and about 25% by weight. The crystalline aluminosilicates can have silica-to-alumina mole ratios of at least about 2:1, such as from about 2 to 12:1, preferably about 4 to 6:1 for best results. The crystalline aluminosilicates are usually available or made in sodium form. This component is preferably reduced, for instance, to less than about 4 or even less than about 1% by weight through exchange with hydrogen ions, hydrogen-precursors such as ammonium ions, or polyvalent metal ions.

Suitable polyvalent metals include calcium, strontium, barium, and the rare earth metals such as cerium, lanthanum, neodymium, and/or naturally-occurring mixtures of the rare earth metals. Such crystalline materials are able to maintain their pore structure under the high temperature conditions of catalyst manufacture, hydrocarbon processing, and catalyst regeneration. The crystalline aluminosilicates often have a uniform pore structure of exceedingly small size with the cross-sectional diameter of the pores being in a size range of about 6 to 20 angstroms, preferably about 10 to 15 angstroms.

Silica-alumina based cracking catalysts having a significant proportion of silica, e.g., about 40 to 90 weight percent silica and about 10 to 40 weight percent alumina, are suitable for admixture with the crystalline aluminosilicate or for use as such as the cracking catalyst.

The decanted oil cracking catalyst fines are more abrasive than resid hydrotreating unit (RHU) fines. The cracking catalyst fines in decanted oil are abrasive and have a tendency to put undue wear on the valves and various feed and product controls used to convey the decanted oil during its use as a solvent.

Our U.S. Pat. No. 4,940,529 teaches a solvent extraction deasphalting unit for hydrotreated resid from vacuum tower bottoms. The solvent extraction unit comprises a mixer and two or three separator vessels or zones operated slightly below or above the critical conditions of the solvent.

Our U.S. Pat. No. 4,808,298 is directed to resid hydrotreating and to a minimization of the formation of carbonaceous solids from hydrotreating. U.S. Pat. No. 4,808,298 does this by treating the resid oil feedstock or hydrotreated oil with an aromatic diluent such as decanted oil obtained from the decanted oil line of a fluid catalytic cracker unit. The process illustrated in U.S. Pat. No. 4,808,298 injects the decanted oil diluent into the atmospheric tower and the vacuum tower.

Over the years a variety of processes and equipment have been suggested for refining operations. Typifying some of those prior art processes and equipment are those described in U.S. Pat. Nos:

| | | | |
|---|---|---|---|
| 2,360,272 | 3,563,911 | 4,176,048 | 4,447,313 |
| 2,382,382 | 3,364,136 | 4,191,636 | 4,451,354 |
| 2,398,739 | 3,579,436 | 4,239,616 | 4,454,023 |
| 2,398,759 | 3,635,815 | 4,285,804 | 4,457,830 |
| 2,414,002 | 3,661,800 | 4,290,880 | 4,457,831 |
| 2,425,849 | 3,681,231 | 4,302,323 | 4,478,705 |
| 2,436,927 | 3,766,055 | 4,305,814 | 4,485,004 |
| 2,755,229 | 3,796,653 | 4,331,533 | 4,486,295 |
| 2,879,224 | 3,838,036 | 4,332,674 | 4,495,060 |
| 2,884,303 | 3,844,973 | 4,341,623 | 4,502,944 |
| 2,981,676 | 3,905,892 | 4,341,660 | 4,521,295 |
| 2,985,584 | 3,909,392 | 4,381,987 | 4,525,267 |
| 3,004,926 | 3,923,636 | 4,391,700 | 4,526,676 |
| 3,039,953 | 3,948,756 | 4,400,264 | 4,592,827 |
| 3,168,459 | 4,040,958 | 4,405,441 | 4,606,809 |
| 3,338,818 | 4,082,648 | 4,434,045 | 4,617,175 |
| 3,351,548 | 4,137,149 | 4,439,309 | 4,618,412 |
| 3,513,087 | 4,158,622 | 4,446,002 | 4,622,210 |
| 4,640,762 | 4,673,485 | 4,695,370 | 4,767,521 |
| 4,655,903 | 4,681,674 | 4,720,337 | 4,769,127 |
| 4,661,265 | 4,686,028 | 4,743,356 | 4,773,986 |
| 4,662,669 | 4,692,318 | 4,753,721 | 4,808,289 |
| | | | 4,818,371 |

It is, therefore, desirable to provide an improved process for substantially reducing the amount of cracking catalyst fines in decanted oil and to provide an improved process for deasphalting resid.

DEFINITIONS

The term "asphaltenes" as used herein, means asphaltenes which have been separated and obtained from a deasphalting unit. Asphaltenes comprise a heavy polar fraction. The asphaltene fraction is the residue which remains after the resins and oils have been separated from resid in a deasphalting unit. Asphaltenes from vacuum resid are generally characterized as follows: a Conradson or Ramsbottom carbon residue of 30 to 90 weight % and a hydrogen to carbon H/C atomic ratio of 0.5% to less than 1.2%. Asphaltenes can contain from 50 ppm to 5000 ppm vanadium and from 20 ppm to 2000 ppm nickel. The sulfur concentration of asphaltenes can be from 110% to 250% greater than the concentration of sulfur in the resid feed oil to the deasphalter. The nitrogen concentration of asphaltenes can be from 110% to 350% greater than the concentration of nitrogen in the resid feed oil to the deasphalter.

As used herein, the terms "deasphalting unit" and "deasphalter" mean one or more vessels or other equipment which are used to separate asphaltenes from oils and resins.

The term "fine-lean DCO", or "fine-free DCO" as used herein, means decanted oil having less than 20 ppm silica and less than 20 ppm alumina.

The term "low sulfur" resid as used herein means a resid comprising less than 2% by weight sulfur. Resid containing sulfur, other than low sulfur resid, is sometimes characterized as high sulfur resid.

The term "resins" as used herein, means resins that have been separated and obtained from a deasphalting unit. Resins are denser or heavier than deasphalted oil and comprise more aromatic hydrocarbons with highly aliphatic substituted side chains. Resins, which also comprise metals, such as nickel and vanadium. Resins from vacuum resid can be generally characterized as follows: a Conradson or Ramsbottom carbon residue of 10 to less than 30 weight and a hydrogen to carbon (H/C) atomic ratio of 1.2% to less than 1.5%. Resins can contain 1000 ppm or less of vanadium and 300 ppm or less of nickel. The sulfur concentration in resins can be from 50% to 200% of the concentration of sulfur in the resid oil feed to the deasphalter. The nitrogen concentration in resins can be from 30% to 250% of the concentration of nitrogen in the resid oil feed in the deasphalter.

The terms "resid oil" and "resid" as used herein, mean residual oil.

The term "solvent-extracted oil" (SEU) as used herein, means substantially deasphalted, substantially deresined oil which has been separated and obtained from a solvent extraction unit.

The term "solvent extraction unit" (SEU) as used herein, means a deasphalter in which resid is separated into oil, resins, and asphaltenes by means of one or more solvents.

The term "supercritical conditions" as used herein, means a condition in a deasphalting unit where the solvent does not exist in both a vapor phase and a liquid phase. Under such circumstances, the solvent is generally in a gaseous or vapor phase.

SUMMARY OF THE INVENTION

In keeping with one aspect of the invention, we provide an improved process for deasphalting resid and for reducing fines in decanted oil. We mix decanted oil containing cracking catalyst fines with the resid to form a DCO-resid mixture. Then we treat the DCO-resid mixture with a solvent extraction unit or a four-stage deasphalting unit.

The resid may be the heavy fraction product from a resid hydrotreating unit (RHU), a hydrotreated resid from vacuum tower bottoms (RHU-VTB), atmospheric tower bottom resid, or a high sulphur resid. In many instances, a high sulphur crude is fed to a hydrotreating unit or a plurality of hydrotreating units. The resids from the resid hydrotreating units (RHU) can be further fractionated in a fractionator such as in an atmospheric tower and/or vacuum tower, leaving resid bottoms. The resid bottoms are further separated into separate streams of resins, asphaltenes, and oil, in the four-stage solvent extraction unit of the present invention. The deasphalted, solvent-extracted oil can be cracked in a catalytic cracking unit to produce gasoline and other high value products. The deasphalted, solvent-extracted resins are recycled to the ebullated bed reactor of the resid hydrotreating unit as part of the feedstock. The asphaltenes can be transported for use as solid fuel. Some of the asphaltenes can also be fed to the coker and coked, or passed to a calciner for subsequent use as coke in a metal processing mill.

The asphaltenes which have been hydrotreated and separated in the deasphalter, in contrast to virgin asphaltenes, have relatively low sulphur, typically less than 3.5% by weight, and can be used directly as solid fuel.

Hydrotreated deasphalted oils generally contain low concentrations of RAMS carbon, sulfur, and metals, and are especially useful as catalytic cracker feed. It is unexpected to be able to isolate a large fraction (about 40-70 wt%) of deasphalted oil from the vacuum bottoms effluent that has low RAMS carbon, in that hydrotreating generally causes the RAMS carbon in the vacuum bottoms to increase about 50% or more relative to the virgin unhydrotreated vacuum residue. Also, it was surprisingly found that the increase in RAMS carbon in the hydrotreated vacuum bottoms is due to a selective increase in the concentration of RAMS carbon in the asphaltene fraction, while the RAMS carbon content of the deasphalted oils and resins are relatively unchanged compared to virgin unhydrotreated resid.

More than 95% by weight of the metals in the vacuum bottoms were removed from the deasphalted oil during solvent extraction. These peculiar findings make the deasphalting of hydrotreated vacuum bottoms a particularly attractive alternative to direct delayed coking in that the asphaltene fraction is so refractory and of such low reactivity as to produce such a small oil yield that it is economically used as a solid fuel. The deasphalted oil and/or resins are substantially fine-free and have substantially no silica fines (less than 20 ppm) and no alumina fines (less than 20 ppm). Thus, DCO recovered from the fractionators has substantially no cracking catalyst fines and can be advantageously used as a solvent to control the formation of carbonaceous solids in the hydrotreating unit. Furthermore, the hydrotreated resins fraction is comparable in reactivity to virgin resid and converts efficiently and effectively to lighter products upon recycle to the resid hydrotreating unit.

The method of our invention generally treats a resid selected from hydrotreated resid, low sulfur resid (LSR), high sulfur resid, and preferably vacuum tower bottoms from a resid hydrotreating unit. The solvent used for the solvent extraction is selected from non-aromatic hydrocarbon solvents having 3-7 carbon atoms and mixtures of the solvents. The preferred solvents are butane, pentane, isomers thereof and mixtures thereof.

We use two mixers and four separators. The first mixer is fed a resid with low aromatic content oil and a portion of a non-aromatic solvent. The resid and solvent are mixed and fed to a first separator. Additional non-aromatic solvent is fed countercurrently to the first separator. In the first separator there are generally formed two phases. The first phase is an oil solvent phase and the second phase is an asphaltene-resin phase. The first phase of oil-solvent is recovered and fed to a second separator where solvent extracted oil (SEU) and solvent are recovered. The solvent from the second separator may be recycled as desired, i.e. to the first separator and/or mixer and/or to the third separator and/or second mixer. The resin-asphaltene mixture from the first separator is mixed with DCO containing cracking catalyst fines in a second mixer. The resin-asphaltene mixture is conveyed along with the DCO containing fines to the third separator. Deresined asphaltenes containing the fines and a fine-lean DCO-resin-solvent mixture are recovered from the third separator. Conveyed to a fourth separator is the fine-lean DCO-resin-solvent and a fine-lean DCO-resin mixture. The solvent from the fourth separator may be selectively recycled, i.e., to the first and/or third separator and/or to the first and/or second mixer.

If desired, the first and second separators and first mixer may use a different solvent than the second mixer and third and fourth separators.

Also, if desired, LSR may be fed to the second mixer.

The fine-lean DCO-resin mixture may be fed directly to a hydrotreating unit.

Fine-lean DCO is a valuable product which can be upgraded in various processes since DCO is reactive toward hydrogenation. Further, fine-lean DCO is a good solvent and as stated above, aids in controlling the carbonaceous solids formed in a resid hydrotreating unit.

A more detailed explanation is provided in the following description and appended claims taken in conjunction with the accompanying drawings.

DETAILED DESCRIPTION OF THE PREFERRED EMBODIMENT

Figure 1:
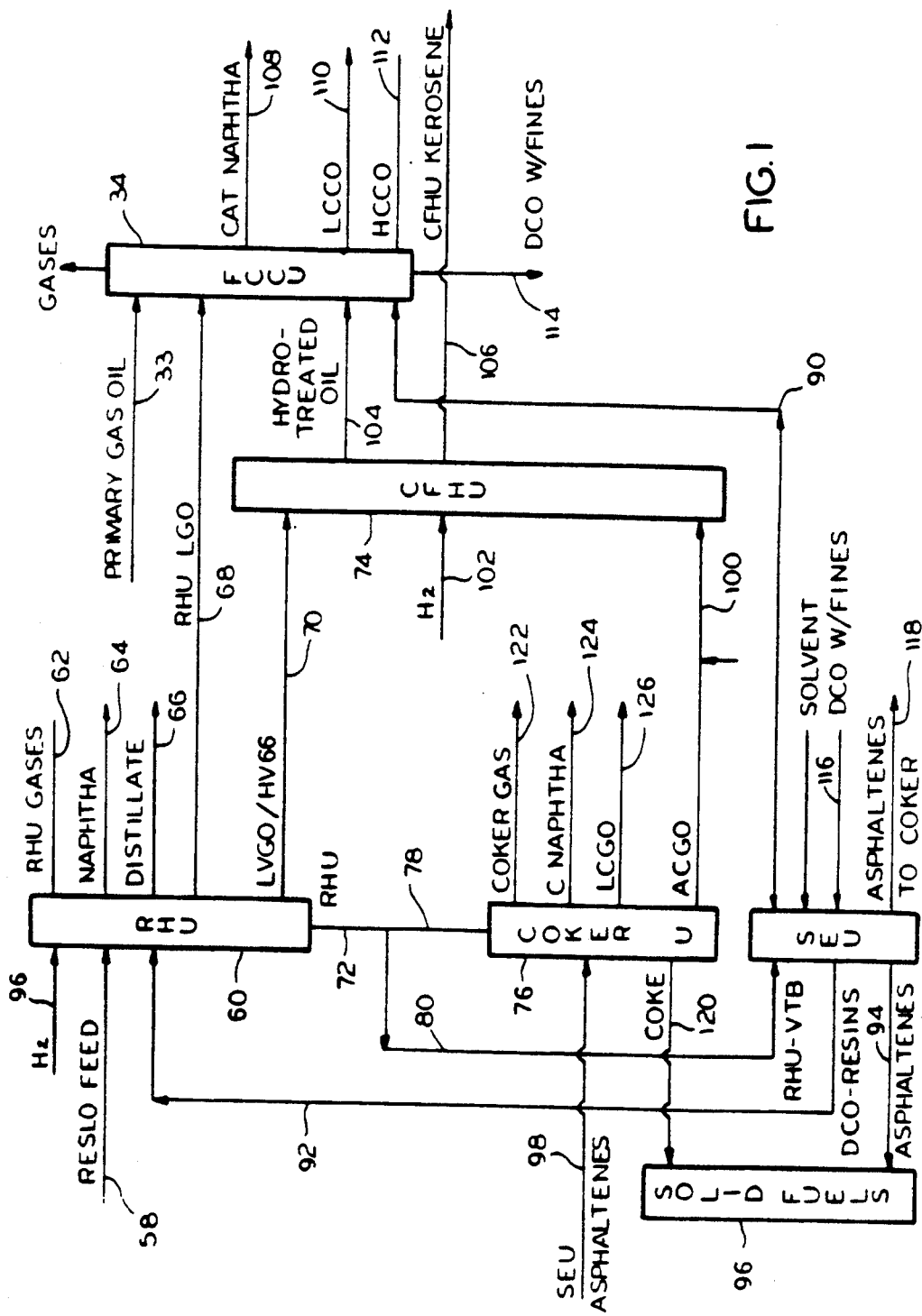
FIG. 1 is a schematic flow diagram of a refinery in accordance with principles of the present invention.

In refining (FIG. 2), unrefined, raw, whole crude oil (petroleum) is withdrawn from an above ground storage tank 10 at about 75° F. to about 80° F. by a pump 12 and pumped through feed line 14 into one or more desalters 16 to remove particulates, such as sand, salt, and metals, from the oil. The desalted oil is fed through furnace inlet line 18 into a pipestill furnace 20 where it is heated to a temperature, such as to 750° F. at a pressure ranging from 125 to 200 psi. The heated oil is removed from the furnace through exit line 22 by a pump 24 and pumped through a feed line 25 to a primary distillation tower 26.

The heated oil enters the flash zone of the primary atmospheric distillation tower, pipestill, or crude oil unit 26 before proceeding to its upper rectifier section or the lower stripper section. The primary tower is preferably operated at a pressure less than 60 psi. In the primary tower, the heated oil is separated into fractions of wet gas, light naphtha, intermediate naphtha, heavy naphtha, kerosene, virgin gas oil, and primary reduced crude. A portion of the wet gas, naphtha, and kerosene is preferably refluxed (recycled) back to the primary tower to enhance fractionation efficiency.

Wet gas is withdrawn from the primary tower 26 through overhead wet gas line 28. Light naphtha is removed from the primary tower through light naphtha line 29. Intermediate naphtha is removed from the primary tower through intermediate naphtha line 30. Heavy naphtha is withdrawn from the primary tower 26 through heavy naphtha line 31. Kerosene and oil for producing jet fuel and furnace oil are removed from the primary tower through kerosene line 32. Primary virgin, atmospheric gas oil is removed from the primary tower through primary gas oil line 33 and pumped to the fluid catalytic cracking unit (FCCU) 34 (FIG. 1).

Primary reduced crude is discharged from the bottom of the primary tower 26 (FIG. 2) through the primary reduced crude line 35. The primary reduced crude in line 35 is pumped by pump 36 into a furnace 38 where it is heated, such as to a temperature from about 520° F. to about 750° F. The heated primary reduced crude is conveyed through a furnace discharge line 40 into the flash zone of a pipestill vacuum tower 42.

The pipestill vacuum tower 42 is preferably operated at a pressure ranging from 35 to 50 mm of mercury. Steam is injected into the bottom portion of the vacuum tower through steam line 44. In the vacuum tower, wet gas is withdrawn from the top of the tower through overhead wet gas line 46. Heavy and/or light vacuum gas oil are removed from the middle portion of the vacuum tower through heavy gas oil line 48. Vacuum-reduced crude is removed from the bottom of the vacuum tower through vacuum-reduced crude line 50. The vacuum-reduced crude typically has an initial boiling point near about 1000° F.

The vacuum-reduced crude, also referred to as resid, resid oil, and virgin unhydrotreated resid, is pumped through vacuum-reduced crude lines 50 and 52 by a pump 54 into a feed drum or surge drum 56. Resid oil is pumped from the surge drum through resid feed line 58 (FIG. 1) into a resid hydrotreating unit complex 60 (RHU) which has a plurality of resid hydrotreating units and associated refining equipment.

Each resid hydrotreating unit can be a reactor train comprising a cascaded series or set of ebullated bed reactors. Hydrogen is injected into the ebullated bed reactors and a relatively high sulfur resid or sour crude is fed to the reactor where it is hydroprocessed (hydrotreated) in the presence of ebullated (expanded) fresh and/or equilibrium hydrotreating catalyst and hydrogen to produce an upgraded effluent product stream with reactor tail gas (effluent off gases) leaving used spent catalyst. Hydroprocessing in the RHU includes demetallation, desulfurization, (denitrogenation, resid conversion, oxygen removal (deoxygenation), hydrocracking, removal of Rams carbon, and the saturation of olefinic and aromatic hydrocarbons.

Each of the reactor trains has a plurality of reactors in series, i.e. ebullated bed reactors. The oil feed is typically resid oil (resid) and heavy gas oil. The feed gas comprises upgraded recycle gases and fresh makeup gases. Demetallation primarily occurs in the first ebullated bed reactor in each train. Desulfurization occurs throughout the ebullated bed reactors in each train. The effluent product stream typically comprises light hydrocarbon gases, hydrotreated naphtha, distillates, light and heavy gas oil, and unconverted hydrotreated resid. The hydrotreating catalyst typically comprises a metal hydrogenating component dispersed on a porous refractory, inorganic oxide support.

The resid hydrotreating unit is quite flexible and, if desired, the same catalyst can be fed to one or more of the reactors; or, a separate demetallation catalyst can be fed to the first reactor while a different catalyst can be fed to the second and/or third reactors. Alternatively, different catalysts can be fed to each of the reactors, if desired. The used and spent catalyst typically contains nickel, sulfur, vanadium, and carbon (coke). Many tons of catalyst are transported into, out of, and replaced in the ebullated bed reactors daily.

Although we have just described the use of ebullated bed reactors, fixed bed reactors may also be used. The ebullated bed reactors are preferred.

As shown in FIG. 1, the products produced from the resid hydrotreating units in the ebullated bed reactors include: light hydrocarbon gases (RHU gases) in gas line 62, naphtha comprising light naphtha, intermediate naphtha, heavy naphtha and vacuum naphtha in one or more naphtha lines 64, distillate comprising light distillate and mid-distillate in one or more distillate lines 66; light gas oil in gas oil line 68; light vacuum gas oil and heavy vacuum gas oil in one or more vacuum gas oil lines 70; and hydrotreated vacuum resid comprising vacuum tower bottoms in a vacuum resid line 72.

Light and intermediate naphthas can be sent to a vapor recovery unit for use as gasoline blending stocks and reformer feed. Heavy naphtha can be sent to the reformer to produce gasoline. The mid-distillate oil is useful for producing diesel fuel and furnace oil, as well as for conveying and/or cooling the spent catalyst.

Light gas oil from a RHU is useful as feedstock for the catalytic cracking unit 34. Light and heavy vacuum gas oils can be upgraded in a catalytic feed hydrotreating unit 74 (CFHU). Some of the hydrotreated resid from vacuum tower bottoms (RHU-VTB) can be sent to the coker unit 76 via coker inlet line 78 to produce coke. A substantial portion of the vacuum (RHU-VTB) resid is fed through a feeder line or inlet line 80 to the mixer 82 deasphalter, deasphalting unit or sovent extraction unit (SEU) 88 where the RHU-VTB is separated into mixture of deasphalted oil, resins, and asphaltenes.

DCO with cracker catalyst fines is fed through feeder line 116 to the SEU 88.

In one embodiment, the deasphalter 88 (FIG. 1) comprises a solvent extraction unit operated with supercritical solvent recovery. Deasphalted solvent-extracted oil (SEU oil) in SEU oil line 90 is useful as a feedstock to the catalytic cracking unit 34 to increase the yield of gasoline and other hydrocarbon liquids. The mixture of DCO and deasphalted solvent-extracted resins (DCO-resin mixture) in DCO-resin line 92 are useful as part of the feed to the resid hydrotreating unit (RHU) 60 to increase the yield of more valuable lower-boiling liquid hydrocarbons.

A portion of the asphaltenes can be conveyed or passed through an asphaltene line or chute 94 or otherwise transported to a solid fuels mixing and storage facility 96, such as a tank, bin or furnace, for use as solid fuel. Another portion of the solvent-extracted asphaltenes (SEU asphaltenes) can be conveyed or passed through a SEU asphaltene line or chute 98 to the coker 76.

The effluent product streams discharged from the reactors comprise hydrotreated resid oil and reactor tail gas (effluent off gases). The tail gas comprises hydrogen, hydrogen sulfide, ammonia, water, methane, and other light hydrocarbon gases, such as ethane, propane, butane and pentane.

Heavy coker gas oil from line 100 (FIG. 1), and/or heavy vacuum gas oil (HVGO) from the heavy vacuum gas oil lines 48 (FIG. 2) and possibly solvent extracted oil 90 (FIG. 1) are conveyed into an optional catalytic feed hydrotreater or catalytic feed hydrotreating unit (CFHU) 74 (FIG. 1). There, it is hydrotreated with hydrogen from hydrogen feed line 102 at a pressure ranging from atmospheric pressure to 2000 psia, preferably from 1000 psia to 1800 psia at a temperature ranging from 650° F. to 750° F. in the presence of a hydrotreating catalyst. The hydrotreated gas oil is discharged through a catalytic feed hydrotreater discharge line 104.

Light atmospheric gas oil in RHU LGO line 68 and/or primary gas oil in line 33 from the primary tower 26 (pipestill) can also be fed and conveyed into the catalytic cracking reactor 34. Kerosene can be withdrawn from the catalytic feed hydrotreating unit 74 (FIG. 1) through CFHU kerosene line 106.

Suitable cracking catalyst for the FCCU 34 include, but are not limited to, those catalysts which contain silica and/or alumina, especially the acidic type. The cracking catalyst may contain other refractory metal oxides such as magnesia or zirconia. The catalyst was described above in more detail.

Naphtha is withdrawn from the FCCU 34 through a naphtha line 108. LCCO is withdrawn from the FCCU through a light catalytic cycle oil line 110. HCCO is withdrawn from the FCCU product fractionation section through a heavy catalytic cycle oil line 112. Decanted oil is withdrawn from the bottom of the FCCU through a decanted oil line 114. The DCO contains fine particles of the catalyst (fines). These particles are detrimental to processing equipment. These particles are very difficult to remove by conventional processes such as filtering and centrifuging.

Our invention removes these particles by treating the DCO from the FCCU with an asphaltene-resin mixture. The DCO containing cracking catalyst fines can be fed to the SEU 88 via DCO feed line 116. In the SEU 88 the DCO is mixed with asphaltene-resin mixture.

As shown in FIG. 1, resid (i.e., RHU-VTB) in RHU-VTB line 78 is fed into the coker (coking vessel) 76. Solvent-extracted asphaltenes in the SEU asphaltene line 118 can also be conveyed to the coker 76. In the coker 76, resids and solvent-extracted asphaltenes are coked at a coking temperature of about 895° F. to about 915° F. at a pressure of about 10 psig to about 50 psig. Coke is withdrawn from the coker 76 through chute, conduit, or line 120 and transported to a coke storage area for use as solid fuel.

In the coker tower 76, the coker product can be separated into fractions of coker gas, coker naphtha, light coker gas oil (LCGO), and heavy coker gas oil (HCGO). Coker gas can be withdrawn from the coker through coker gas line 122. Coker naphtha can be withdrawn through coker naphtha line 124. Light coker gas oil can be withdrawn through light coker gas oil line 126. Heavy coker gas oil can be withdrawn through heavy coker gas oil line 100 and hydrotreated in the catalytic feed hydrotreater (CFHU) 74 before being catalytically cracked in the catalytic cracker 34 (FCCU).

The critical temperatures and pressures for the solvents generally used in this invention are as follows:

|  | T (°F.) | P (psi) |
| --- | --- | --- |
| butane | 307 | 530 |
| pentane | 387 | 484 |
| hexane | 455 | 435 |
| heptane | 512 | 395 |

The resid is a resid wherein a substantial portion of the resid boils above about 850° F. and preferably above about 1000° F. The decanted oil is a DCO wherein a substantial portion of the DCO boils above about 850° F. and preferably above about 500° F.

Figure 3:
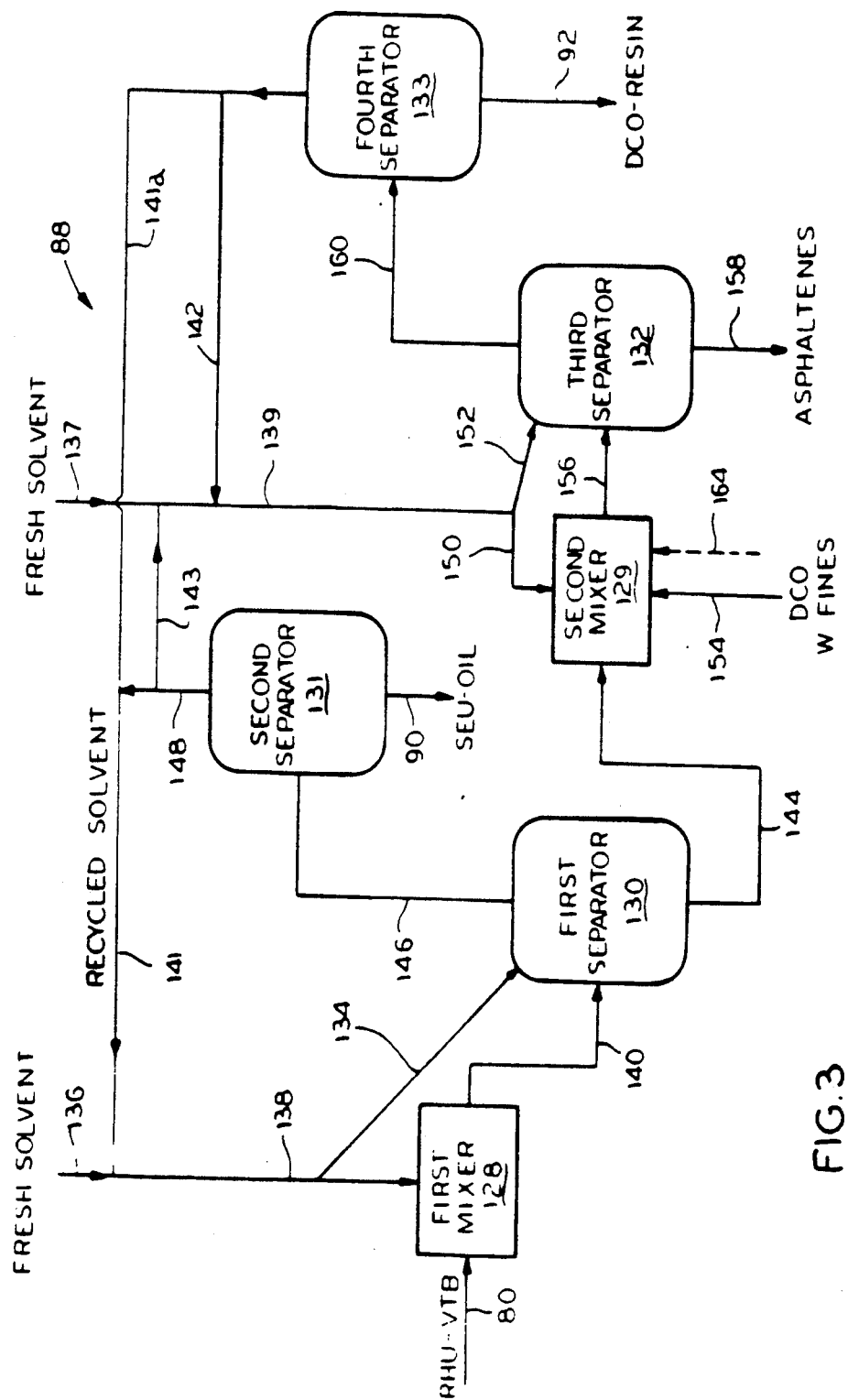
FIG. 3 is a schematic flow diagram of a four-stage solvent extraction unit.

Our four stage solvent extraction deasphalting unit 88 is illustrated in FIG. 3. This four stage unit is used preferably to provide fine-free DCO and SEU oil free of DCO. The SEU oil in this unit can be fed directly to the FCC.

The solvent extraction deasphalting unit 88 of FIG. 3 comprises two mixers 128, 129 and four separator vessel or zones 130, 131, 132, 133, operated slightly below or above the critical condition of the solvent. A resid, i.e., resid hydrotreated vacuum tower bottoms is conveyed to mixing zone 128 via RHU-VTB line 80. Fresh makeup solvent in fresh solvent lines 136, 137 is pumped through combined solvent lines 138, 139 into the mixers 128, 129. Recycled solvent in recycle solvent line 141 is also pumped through the combined solvent line 138 into the mixer 128. For best results, the solvent comprises substantially pentane and/or butane. The total solvent (fresh and recycle solvent) to feed (vacuum tower bottoms) ratio is from about 3:1 to about 20:1 and preferably from about 8:1 to about 12:1 for best results. In some circumstances, it may be desirable to use or include other solvents.

Recycled solvent in recycle solvent line 142 is also pumped through the combined solvent line 139 into mixer 129. The total solvent (fresh and recycle solvent) to feed (resins-asphaltene-DCO mixture) ratio is about 3:1 to about 20:1 and preferably from about 8:1 to about 12:1.

When the same solvent is used in fresh solvent lines 136 and 137, solvent may be recycled from the second separator via recycle solvent line 143 and combined solvent line 139 to the second mixer 129 and/or to the third separator. Also, solvent from the fourth separator may be recycled via recycle line 141a to this first mixer 128 and/or first separator 130.

In the preferred embodiment, only a minority of the solvent is mixed in mixers 128 and 129. The majority of the solvent is injected countercurrently to the feed at the bottom portion of the separators 130 and 132 through lines 134 and 152 respectively in order to obtain countercurrent extraction of the asphaltenes and resin in vessel (first separator) 130 and asphaltenes in the third separator 132.

The resid (vacuum tower bottoms) and solvent are mixed in the mixer 128 and conveyed through a resid-solvent line 140 to the first separator vessel or zone 130. In some circumstances, it may be desirable that the vacuum tower bottoms and solvent be fed directly into the first separator 130 in the above ratios without previously mixing the vacuum tower bottoms and solvent.

In the first separator 130, the SEU asphaltenes and resins containing a substantial amount of organometallic components are solvent-extracted and separated from the mixture of solvent and hydrotreated resid (vacuum tower bottoms). The solvent-extracted asphaltenes and resins are withdrawn from the first separator 130 through SEU asphaltene-resin line 144 and conveyed or otherwise transported to a second mixer 129. A mixture of solvent and SEU oil is withdrawn from the first separator and conveyed or otherwise transported through SEU oil-solvent line 146, to the second separator 131. The first separator is operated at an elevated temperature and pressure to effect separation of asphaltenes and resins from the solvent and oils. The solvent and oil are withdrawn from the first separator 130 through a solvent-oil line 146 and passed via a heater or heat exchanger to the second separator vessel or zone 131.

In the second separator (oil separator) 131, substantially deasphalted demetallized resin-free (SEU) oil is separated from the solvent. The second separator 131 is operated at an elevated temperature and pressure to effect the separation of the SEU oil and solvent. The temperature in the second separator 131 is higher than the temperature in the first separator 130 and above the critical temperature of the solvent. The pressure in the second separator 131 is preferably at least equal to the critical pressure of the solvent. Preferably, the temperature in the second separator 131 is maintained at least about 50° F. above the critical temperature of the solvent. The second separator 131 acts as a flash drum in which the solvent is separated from the SEU oil. When operating at supercritical conditions, no heat of vaporization is required to separate the solvent from the SEU oil, thereby enhancing the energy efficiency of the deasphalter.

The solvent is withdrawn from the second separator 131 via solvent line 148 and recycled through lines 141, 138 and 134 to the mixer 128 and first separator 130. If desired, the solvent from the second separator 131 may be recycled via lines 143, 139, 150 and 152 to the second mixer 129 and/or third separator 132.

The solvent-extracted oil (SEU oil) is discharged from the second separator 131 through an SEU oil line 90 and fed to the catalytic cracker (FCCU) as part of its feedstock as previously described.

Resin and asphaltenes are conveyed from the first separator via resin-asphaltene line 144 to a second mixer 129. Decanted oil containing fines is conveyed to the second mixer via DCO line 154. Fresh solvent and/or recycled solvent from the second and fourth separators may be added to the second mixer. The recycled solvent from the fourth separator 133 is shown as being conveyed by line 142 to the combined solvent line 139. Fresh and/or second separator solvent is conveyed via line 143 to the combined solvent line 139.

The ratio of decanted oil to the resin-asphaltene mixture is from about 1:5 to about 3:2 and preferably from about 3:10 to about 1:1.

The ratio of total solvent to the resin-asphaltene mixture is from about 3:1 to about 20:1 and preferably from about 8:1 to about 12:1.

The solvent, asphaltene-resin mixture and DCO mixture are conveyed from the second mixer 129 through a heater or heat exchanger via line 156 to the third separator 132.

The fresh solvents fed through lines 136 and 137 may be different if desired. In that case, lines 141a and 143 are not operative. The use of different solvents will, in some cases, produce higher purity oils while maintaining low asphalt yield.

The third separator 132 can be operated at a temperature from about 150° F. to above the critical temperature of the solvent and a pressure at least equal to the vapor pressure of the solvent when at a temperature below the critical temperature of the solvent and at least equal to the critical pressure of the solvent when at a temperature equal to or above the critical temperature of the solvent. Preferably, the operating temperature of the third separator 132 ranges from about 20° F. below the critical temperature of the solvent to about the critical temperature of the solvent.

The solvent-extracted asphaltenes containing the DCO catalyst fines are withdrawn from the third separator 132 via SEU asphaltene line 158 and conveyed to a solid fuel area and/or coker.

The majority of solvent, fine-lean DCO, and the remaining resins of the hydrotreated resid are withdrawn from the third separator 132 and conveyed through DCO-solvent-resins line 160 and a heater or heat exchanger to the fourth separator vessel or zone 133. The fourth separator 133 is maintained at a temperature level higher than the temperature level in the third separator 132 and at the same pressure as the third vessel 132 minus any pressure drops between vessels 132 and 133, to effect a separation of the influent residue into a fluid-like light phase comprising solvent and a fluid-like second heavy phase comprising fine-lean DCO and resins and a minority of the solvent.

The light phase which separates within fourth separator 133 collects in an upper portion of the fourth separator 133. In the fourth separator (resin separator) 133, deasphalted resins and fine-lean DCO are solvent-extracted and separated from the influent residue. The solvent-extracted deasphalted resins and fine-lean DCO mixture is discharged from the fourth separator 133 through a DCO-resin line 92 and fed, if desired, to an ebullated bed reactor of the resid hydrotreating unit as part of the feed as discussed previously.

In the preferred embodiment, the fourth separator 133 is operated at a temperature above that in the third separator 132. The pressure level of fourth separator 133 is maintained equal to the vapor pressure of the third separator 132 minus any pressure drop between the vessels 132 and 133 so that flow between the vessels 132 and 133 can occur through overflow and not require the use of a pump. However, if desired, a pump could be used since vapor-liquid equilibrium would allow the third vessel 132 to be operated at a pressure below that of fourth vessel 133. Preferably, the operating temperature of the fourth separator 133 is from about −5° F. to about 100° F. above the temperature in the third separator 132, and most preferably at a temperature of from about 5° F. to about 50° F. above the critical temperature of the solvent and the operating pressure of the fourth separator 133 is substantially the same pressure level as is maintained in third separation zone 132.

The first, second and third heavy phases of asphaltenes, resins, and SEU oil, respectively, can be passed into individual stripping sections (not shown), such as steam strippers, to strip any solvent that may be contained in the phases.

Alternatively, LSR can be fed to the mixer 128 via LSR feed line 164.

As noted above, this four stage deasphalting unit provides a process for deasphalting two feeds while maintaining the quality of the valuable deasphalted oil (DAO). The first feed for this process is an oily feed, i.e., a feed having a relatively high concentration of non-aromatic oils. Low sulphur resid, RHU vacuum tower bottoms or RHU products are examples of resid feeds that have a relatively high concentration of non-aromatic oils.

These non-aromatic oils are ideal for catalytic cracking. The aromatic compounds, which are fine-lean, make a valuable addition to the resin stream where aromaticity and modest molecular weight are desirable.

It was unexpectedly and surprisingly found that decanted oil containing cracking catalyst fines can be substantially cleaned of their fines by mixing the decanted oil with a resid and subjecting the mixture to a solvent extraction process.

Further, it was unexpected and surprisingly found that mixing decanted oil with a hydrotreated vacuum tower bottom resid and subjecting these to four-stage solvent extraction increases the recovery of valuable products and reduces the yield of asphaltenes compared to deasphalting the feeds separately.

The following Examples 1 and 2 were run using a three separator deasphalting unit and Examples 3 and 4 were run using a two separator deasphalting unit. The results for the four separator deasphalting unit of the present invention would be equivalent with regard to the amount of catalyst fines removed from the DCO and the yield of asphaltene.

EXAMPLE 1

Figure 2:
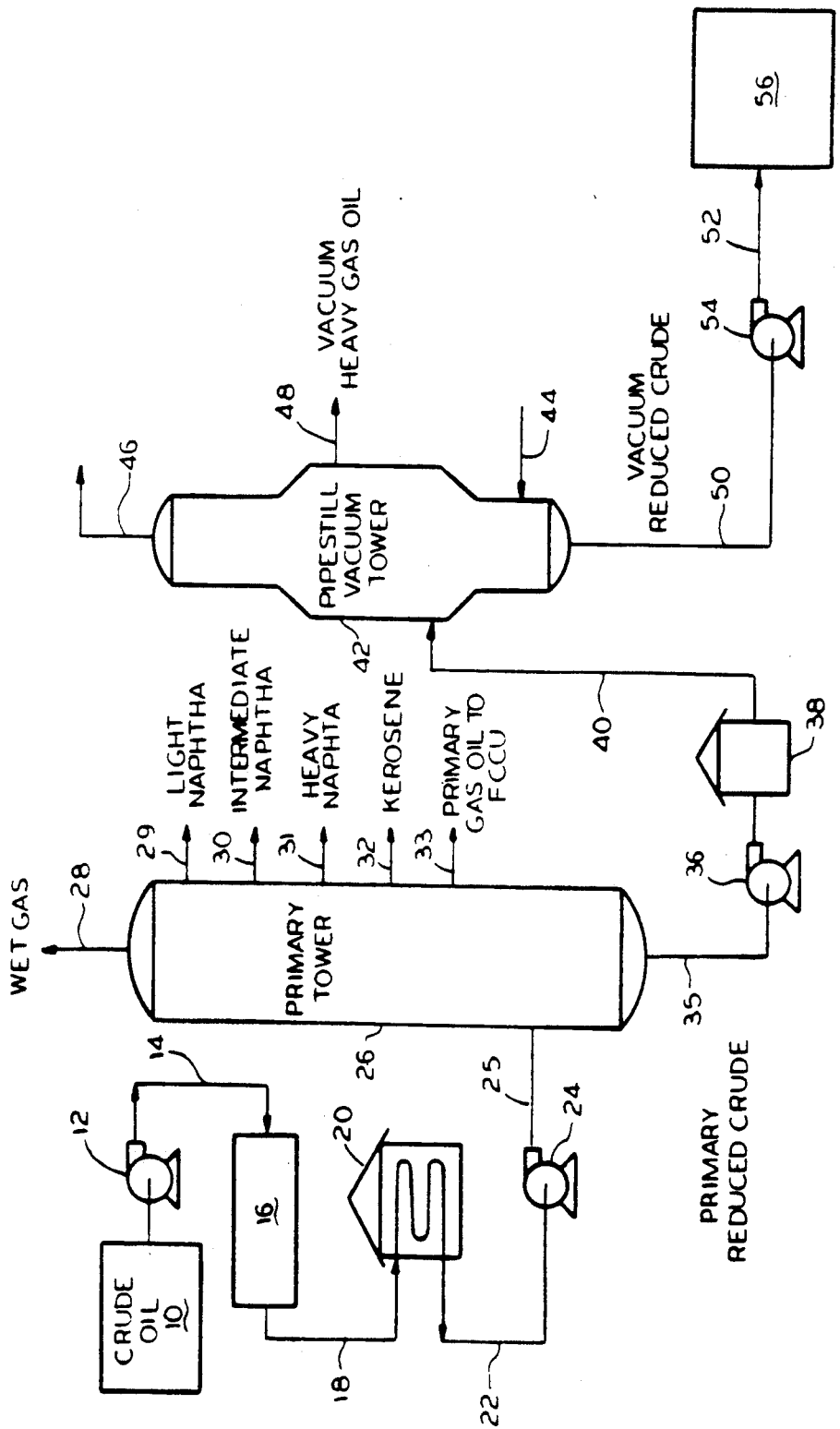
FIG. 2 is a schematic flow diagram for partially refining crude oil.

Vacuum-reduced crude (resid oil) was hydrotreated in a resid hydrotreating unit similar to that shown in FIGS. 1 and 2 and then in a three-stage or three separator deasphalting unit and under operating conditions similar to that described previously in this specification except that no decanted oil or low sulphur resid was added. The vacuum tower bottoms (hydrotreated resid) were separated by solvent extraction into fractions of asphaltenes, (deasphalted) resins and (deasphalted) deresined SEU oil. The composition of the hydrotreated resid, asphaltenes, resins, and SEU oil are shown in Table 1.

TABLE 1

|  | Oil | Resin | Asphaltene | FEED Sum of Products | Measured |
|---|---|---|---|---|---|
| Yield, Wt % | 40 | 36 | 24 | — | — |
| Carbon, Wt % | 87.08 | 87.18 | 88.78 | 87.52 | 87.53 |
| Hydrogen, Wt % | 10.77 | 10.29 | 6.40 | 9.55 | 9.38 |
| Sulfur, Wt % | 1.45 | 1.73 | 4.10 | 2.19 | 2.16 |
| Nitrogen, Wt % | 0.41 | 0.49 | 1.26 | 0.64 | 0.61 |
| Nickel, ppm | 0.9 | 2.8 | 169 | 42 | 39 |
| Vanadium, ppm | 1.0 | 3.1 | 354 | 86 | 76 |
| Iron, ppm | 0.6 | 0.6 | 43 | 11 | 6 |
| H/C, Atomic | 1.47 | 1.41 | 0.86 | 1.30 | 1.28 |
| RAMS carbon, Wt % | 8.2 | 14.4 | 70.4 | 25.4 | 26.6 |
| CCR, Wt % | 10.3 | 13.8 | 71.5 | 26.6 | 26.7 |
| API | 14.1 | 7.9 | (−24.5) | (2.6) | 2.6 |
| % $C_4$ | 33.8 | 38.3 | 73.9 | 45.0 | 44.8 |
| 1000−, Wt % | 25 | 11 | — | 14 | 18 |
| Ring and Ball, °F. | 112 | 95 | 377 | — | 112 |
| Viscosity @ 210 F., cSt | 70 | 128 | — | — | 764 |
| Viscosity @ 275 F., cSt | 20 | 31 | — | — | 101 |
| $C_5$ Insoluble, Wt % | 2.3 | 3.6 | 96.5 | 25.9 | 24.3 |
| $C_7$ Insoluble, Wt % | 1.9 | 2.5 | 93.7 | 24.7 | 16.5 |

EXAMPLE 2

The same RHU-VTB resid of Example 1 was deasphalted in a two-stage SEU under operating conditions similar to that described in Example 1. However, in this example, we use DCO which contains cracking catalytic fines and has a substantial portion thereof boiling above about 850° F. This is added to the mixer. Properties of the products obtained are presented in Table 2.

TABLE 2

|  | Oil | Resin | Asphaltene | Feed Sum of Products | Measured |
|---|---|---|---|---|---|
| Yield, Wt % | 64 | 11 | 25 | — | — |
| Carbon, Wt % | 87.86 | 87.95 | 89.21 | 88.21 | 88.12 |
| Hydrogen, Wt % | 10.19 | 9.33 | 6.17 | 9.09 | 9.05 |
| Sulfur, Wt % | 1.52 | 1.85 | 3.78 | 2.12 | 1.83 |
| Nitrogen, Wt % | 0.36 | 0.46 | 0.98 | 0.53 | 0.53 |
| Nickel, ppm | 0 | 0 | 161 | 40 | 41 |
| Vanadium, ppm | 0 | 4 | 393 | 99 | 108 |
| Iron, ppm | 0 | 0 | 73 | 18 | 22 |
| H/C, Atomic | 1.38 | 1.26 | 0.82 | 1.23 | 1.22 |
| RAMS carbon, Wt % | 7.9 | 18.2 | 67.3 | 24.0 | 26.0 |
| CCR, Wt % | 9.8 | 18.5 | 67.5 | 25.2 | 25.3 |
| API | 8.6 | 3.3 | (−18.4) | (1.2) | (1.2) |
| Ring and Ball, °F. | 127 | 116 | 361 | — | 110 |
| Viscosity @ 210 F., cSt | 63 | 271 | — | — | 591 |

TABLE 2-continued

| | Oil | Resin | Asphaltene | Feed Sum of Products | Measured |
|---|---|---|---|---|---|
| Viscosity @ 275 F.*, cSt | 18 | 47 | — | — | 80 |
| C₅ Insoluble, Wt % | 1.6 | 5.9 | 86.6 | 23.3 | 20.5 |
| C₇ Insoluble, Wt % | 0.6 | 3.5 | 80.5 | 20.9 | 15.8 |

EXAMPLE 3

The efficiency of our method for removing catalyst fines is shown by Example 3.

RHU-VTB and 850+° F. DCO was treated with a two stage solvent extraction deasphalter. The solvent used was pentane and the conditions were the same as Example 2.

The recovered asphaltene and DCO-oil-resin mixture were measured to determine the amount of silica and alumina which were removed from the feed.

TABLE 3
SILICA AND ALUMINA CONTENT
FOR PRODUCTS FROM RHU-VTB/DCO 850+

| | Silica (as Oxide) | | Alumina (as Oxide) | |
|---|---|---|---|---|
| | SiO₂ ppm | % of Total | Al₂O₃ ppm | % of Total |
| Feed (Avg of 4 Tests) | 323 ± 16 | — | 478 ± 34 | — |
| Asphaltene (Avg of 5 Tests) | 800 ± 280 | 62 ± 22 | 1032 ± 282 | 54 ± 15 |
| Oils/Resins (Avg of 2 Tests) | 9 ± 4 | 2 ± 1 | 0.6 ± 0.1 | 0.1 ± 0.02 |

As Table 3 illustrates, the silica content in oils/resin stream is less than 9±4 ppm when the starting compound had 323±16 ppm silica and the alumina content in the oils/resins was 0.6±0.1 ppm when the starting compound had 478±34 ppm alumina.

EXAMPLE 4

2,579 lbs. (6 drums) of RHU-VTB and 1,551 lbs. (4 drums of DCO) from Texas City #3 FCU was blended in a mixing kettle. The DCO has a substantial portion boiling above about 500° F.

A portion of the above was treated by the two separator process set out above. The deasphalted oil (DAO) was analyzed as well as the asphaltene obtained from the third separator. DAO comprises a DCO-resin mixture.

An average yield for this run of 10.5 wt% asphaltene and 89.5 wt% deasphalted oil (DAO).

The presence of the decanted oil caused a beneficial reduction in the asphaltene yield. The RHU-VTB used in this test had a slightly lower RAMS carbon content than that used in previous tests (22.5 wt% vs. 26.6 wt%). Therefore, the asphaltene yield is expected to be slightly lower. Based on previous results for hydrocracked resids, the anticipated RHU-VTB asphaltene yield is 19 wt% (vs. 24 wt% in the previous tests). The present test with mixed feed actually yielded 10.5 wt% asphaltene overall, or 16.8 wt% on RHU-VTB (assuming no asphaltenes from decanted oil). If we conservatively assume that the decanted oil yielded 3% asphaltenes then the actual incremental asphaltene yield of the RHU-VTB is 15.0 wt%, 20% lower than the value expected in the absence of a co-solvent effect.

Table 4 presents inspections for a sample of the asphaltenes produced by this example. The properties are similar in most respects to those measured on asphaltenes from RHU vacuum tower bottoms (VTB) without decanted oil present except for lower sulfur content (which reflects lower sulfur in the RHU-VTB used as feed) and a slightly lower H/C (0.82 vs. 0.86). The lower H/C shows that the asphaltenes being rejected are more aromatic and less desirable as a hydrotreater feedstock.

TABLE 4

| | Drum Sample |
|---|---|
| Carbon, wt % | 89.63 |
| Hydrogen, wt % | 6.15 |
| Sulfur, wt % | 2.05 |
| Nitrogen, wt % | 0.97 |
| H/C | 0.82 |
| RAMS, wt % | 71.4 |
| % C₄ (NMR) | 77.4 |
| Oxide Ash, wt % | 0.8 |
| Moisture, wt % | 0.1 |
| % volatiles, wt % | 55.2 |

Referring to Table 5, the presence of the decanted oil significantly alters the DAO properties relative to DAO from RHU-VTB alone. As expected, decanted oil results in a decrease in nitrogen, H/C, RAMS carbon, and API gravity. It increased the aromaticity, yielding a better solvent for control of carbonaceous solids in the RHU.

TABLE 5

| DAO PROPERTIES | |
|---|---|
| Carbon, wt % | 88.52 |
| Hydrogen, wt % | 9.42 |
| Sulfur, wt % | 1.42 |
| Nitrogen | 0.34 |
| Ni, ppm | <2 |
| V, ppm | <2 |
| Fe, ppm | <2 |
| H/C | 1.28 |
| RAMScarbon | 7.83 |
| % C$_a$ (NMR) | 50.3 |
| API | 5.7 |
| Oils | 32.7 |
| Resin | 66.9 |
| Asphaltenes | 0.4 |
| Viscosity | 22.92 CST @ 100° C. |
| Viscosity | 8.35 CST @ 135° C. |

The yields and qualities of the deasphalted SEU oil, resins, and asphaltenes vary considerably with the solvent used in deasphalting and the deasphalting conditions. However, the property ranges given for deasphalted SEU oil, deasphalted resins, and deresined asphaltenes are appropriate for a broad range of process conditions in the use of deasphalters.

It is understood that the qualities of the deasphalted oil, deasphalted resin, and deresined asphaltene fractions can be adjusted somewhat by altering processing conditions in the deasphalter. This adjustment is analogous to raising or lowering the cut points on a distillation tower in order to obtain the product qualities desired.

Although embodiments of this invention have been shown and described, it is to be understood that various modification and substitutions, as well as rearrangements and combinations of process steps and equipment, can be made by those skilled in the art without departing from the novel spirit and scope of this invention. Therefore, the following claims are to be construed to include all equivalent structures, methods and processes.

We claim:

1. A process for deasphalting a hydrotreated resid and substantially removing cracking catalyst fines from decanted oil containing cracking catalyst fines comprising:
   mixing hydrotreated resid with a first non-aromatic $C_3$–$C_7$ hydrocarbon solvent, said hydrocarbon solvent being selected from the group consisting of hydrocarbon solvents having 3–7 carbon atoms and mixtures thereof,
   treating the resid and solvent in a first separator,
   recovering a substantial amount of resin and asphaltene from said first separator as a resin-asphaltene mixture,
   recovering a substantial amount of solvent and deasphalted solvent extracted oil from said first separator as a solvent-oil mixture,
   feeding said solvent-oil mixture to a second separator,
   recovering solvent from said second separator,
   recovering substantially deasphalted solvent extracted oil from said second separator;
   mixing said resin-asphaltene mixture with decanted oil containing cracking catalyst fines to form a fine containing decanted oil-resin-asphaltene mixture,
   conveying said fine containing decanted oil-resin-asphaltene mixture to a third separator,
   mixing said fine containing decanted oil-resin-asphaltene mixture with a second non-aromatic $C_3$–$C_7$ solvent in said third separator,
   recovering substantially deresined solvent extracted fine containing asphaltene from said third separator,
   recovering substantially deasphalted fine-lean decanted oil-resin-solvent mixture from said third separator,
   conveying said fine-lean decanted oil-resin-solvent mixture to a fourth separator,
   recovering a deasphalted solvent extracted fine-lean decanted oil-resin mixture from said fourth separator, and
   recovering solvent from said fourth separator.

2. The method of claim 1 wherein at least a portion of said solvent recovered from the second and fourth separators are selectively recycled to said first and third separators.

3. The method of claim 1 wherein the resid is selected from the group consisting of hydrotreated resid, vacuum tower bottom resid, atmopheric tower bottom resid, low sulfur resid and mixtures thereof.

4. The method of claim 1 wherein a substantial portion of the decanted oil boils above about 850° F.

5. The method of claim 1 wherein a substantial portion of the decanted oil boils above about 500° F.

6. The method of claim 1 wherein the resid is a vacuum tower bottom resid derived from a hydrotreating unit obtained from high sulfur crude and the solvent is selected from the group consisting of butane, pentane, isomers thereof and mixtures thereof.

7. The method of claim 1 wherein at least a portion of the solvent and a portion of solvent recovered from the second separator are added directly to the first separator.

8. The method of claim 1 wherein said first non-aromatic solvent used in the first separator is different than said second non-aromatic solvent used in the third separator.

9. The method of claim 8 wherein at least a portion of the first solvent recovered from the second separator is selectively recycled to the first separator, and at least a portion of the second solvent recovered from the fourth separator is selectively recycled to the third separator.

10. The method of claim 1 wherein a low sulphur resid is selectively added to the feeds of the first separator.

11. A hydrotreating process comprising the steps of,
    hydrotreating a resid with hydrogen in the presence of a hydrotreating catalyst, to produce a hydrotreated resid containing hydrotreating catalyst fines;
    solvent extracting in a first stage of a four-stage solvent extraction unit, a fraction of the hydrotreated resid with a first non-aromatic hydrocarbon solvent selected from the group consisting of hydrocarbon solvents having 3–7 carbon atoms and mixtures thereof,
    recovering a substantial amount of resin and asphaltene from said first stage as a resin-asphaltene mixture,
    recovering a substantial amount of first solvent and deasphalted solvent extracted oil from said first stage as a solvent-oil mixture,
    feeding said solvent-oil mixture to a second stage of said four-stage solvent extraction unit,
    recovering first solvent from said second stage,
    recovering substantially deasphalted oil from said second stage.
    mixing said resin-asphaltene mixture with decanted oil containing cracking catalyst fines to form a decanted oil-resin-asphaltene mixture,
    conveying said decanted oil-resin-asphaltene mixture to a third stage of said four-stage solvent extraction unit,
    solvent extracting in said third stage said decanted oil-resin-asphaltene mixture with a second non-aromatic hydrocarbon solvent being selected from the group consisting of hydrocarbon solvents having 3–7 carbon atoms and mixtures thereof,
    recovering a substantially deresined catalyst enriched asphaltene stream from said decanted oil-resin-asphaltene mixture,
    said catalyst enriched asphaltene stream comprising asphaltenes and a substantial amount of said hydrotreating catalyst fines and said cracking catalyst fines;
    recovering a substantially deasphalted catalyst fine-lean decanted oil-resin-solvent mixture from said third stage,
    conveying said catalyst fine-lean decanted oil-resin-solvent mixture to a fourth stage of said four-stage solvent extraction unit,
    recovering a catalyst fine-lean decanted oil-resin mixture from said fourth stage,
    recovering second solvent from said fourth stage, and hydrocracking said catalyst fine-lean decanted oil-resin mixture in a hydrotreating unit with hydrogen in the presence of a hydrogenation catalyst to produce upgraded oil.

12. The process of claim 11 comprising recovering a solvent-oil mixture containing cracking catalyst fines with less than about 20 ppm silica and less than about 20 ppm alumina from said first stage, and recovering a decanted oil-resin mixture having less than about 20 ppm silica and less than about 20 ppm alumina, from said fourth stage.

13. The process of claim 12 wherein the resid being hydrotreated is selected from the group consisting of high sulfur resid, low sulfur resid and mixtures thereof.

14. The process of claim 12 wherein a substantial portion of the decanted oil boils above about 850° F. and said hydrotreating and said hydrocracking occur substantially simultaneously in the same reactor.

15. The process of claim 12 wherein a substantial portion of the decanted oil boils above about 500° F.

16. The process of claim 13 wherein the resid is a high sulfur crude and the solvent is selected from the group consisting of butane, pentane, isomers thereof and mixtures thereof.

17. The process of claim 12 wherein the solvent is selected from the group consisting of butane, pentane, isomers thereof and mixtures thereof, maintaining the temperature in the third separator from about 20° F. below the critical temperature of the solvent to near the critical temperature of the solvent.

18. The process of claim 17 wherein a substantial portion of the decanted oil boils above about 850° F.

19. A hydrotreating process, comprising the steps of:
substantially desalting crude oil;
heating said desalted crude oil in a pipestill furnace;
pumping said heated crude oil to a primary distillation tower;
separating said heated crude oil in said primary distillation tower into streams of naphtha, kerosene, primary gas oil, and primary reduced crude oil;
pumping said primary reduced crude oil to a pipestill vacuum tower;
separating said primary reduced crude in said pipestill vacuum tower into streams of wet gas, heavy gas oil, and vacuum reduced crude oil providing resid oil;
feeding a composite feed comprising solvent extracted resins, decanted oil, and said virgin unhydrotreated resid oil to a resid hydrotreating unit comprising a series of ebullated bed reactors;
injecting hydrogen-rich gases into said ebullated bed reactors;
conveying resid hydrotreating catalysts to said ebullated bed reactors;
ebullating said composite feed comprising said solvent extracted resins, decanted oil and said virgin unhydrotreated resid oil with said hydrogen-rich gases in the presence of said hydrotreating catalyst in said ebullated bed reactors under hydrotreating conditions to produce upgraded hydrotreated resid oil containing hydrotreating catalyst fines;
separating said upgraded hydrotreated resid oil into vacuum tower bottoms comprising vacuum resid oil containing hydrotreating catalyst fines;
treating in a first stage of a four-stage solvent extraction unit at least a portion of said vacuum tower bottoms with a first non-aromatic hydrocarbon solvent selected from the group consisting of hydrocarbon solvents having 3-7 carbon atoms and mixtures thereof,
recovering a substantial amount of resin and asphaltene from said first stage as a resin-asphaltene mixture;
recovering a substantial amount of spent first solvent and deasphalted oil from said first stage as a solvent-oil mixture;
feeding said solvent-oil mixture to a second stage of four-stage solvent extraction unit;
recovering spent first solvent from said second stage,
recovering substantially deasphalted oil from said second stage;
mixing said resin-asphaltene mixture with decanted oil containing cracking catalyst fines to form a decanted oil-resin-asphaltene mixture,
solvent extracting in a third stage of said four-stage solvent extraction unit a catalyst laden stream of asphaltene from said decanted oil-resin-asphaltene mixture with a second non-aromatic solvent;
said catalyst laden stream of asphaltene comprising substantially deresined asphaltene and a substantial amount of said hydrotreating catalyst fines and cracking catalyst fines;
recovering a substantially deasphalted catalyst lean decanted oil-resin-solvent mixture having a substantially smaller concentration of catalyst fines than said decanted oil-resin-asphaltene mixture;
conveying said catalyst lean decanted oil-resin-solvent mixture to a fourth stage of said four-stage solvent extraction unit;
recovering second solvent from said fourth stage,
recovering a deasphalted catalyst lean decanted oil-resin mixture from said fourth stage; and
recycling said catalyst lean decanted oil-resin mixture to said ebullated bed reactors as part of said composite feed.

20. The process of claim 19 comprising, maintaining the temperature of third stage from about 20° F. below the critical temperature of the solvent to near the critical temperature of the solvent, and,
recovering catalyst lean from said third stage a substantially deresined asphaltene wherein said asphaltene contains a substantial amount of said fines.

21. The process of claim 20 comprising recovering a substantially deasphalted solvent-oil mixture containing cracking catalyst fines with less than about 20 ppm silica and less than about 20 ppm alumina from said first stage, and
recovering catalyst lean decanted oil-resin mixture from said fourth stage having less than about 20 ppm silica and less than 20 ppm alumina, and recycling solvent recovered from said fourth stage to said third stage.

* * * * *

UNITED STATES PATENT AND TRADEMARK OFFICE
CERTIFICATE OF CORRECTION

PATENT NO. : 5,124,025
DATED : June 23, 1992
INVENTOR(S) : Jeffrey J. Kolstad, William I. Beaton, James L. Taylor It is certified that error appears in the above-indentified patent and that said Letters Patent is hereby corrected as shown below:

| Col. | Line | |
|---|---|---|
| 4 | 13 | "carbon H/C)" should be --carbon (H/C)-- |
| 4 | 41 | "30 weight and" should be --30 weight % and-- |
| 6 | 28 | "Conveyed to a fourth separator is the fine-lean DOC-resin-solvent and a fine-lean DCO resin mixture." should be --Conveyed to a fourth separator is the fine-lean DCO-resin-solvent mixture. The fourth separator extracts solvent and a fine-lean DCO-resin mixture.-- |
| 7 | 65 | "(denitrogenation." should be --denitrogenation-- |
| 12 | 60 | "about -5°F." should be --about 5°F-- |

Signed and Sealed this

Thirty-first Day of August, 1993

Attest:

BRUCE LEHMAN

Attesting Officer       Commissioner of Patents and Trademarks